Dec. 13, 1927.

A. O. WANGER 1,652,848

AXLE ALIGNMENT GAUGE

Filed May 25, 1927

Inventor

ARTHUR O. WANGER

By Owen H. Spencer
Attorney

Patented Dec. 13, 1927.

1,652,848

UNITED STATES PATENT OFFICE.

ARTHUR O. WANGER, OF INDIANAPOLIS, INDIANA.

AXLE-ALIGNMENT GAUGE.

Application filed May 25, 1927. Serial No. 194,211.

This invention relates to means for testing the relative alignment of the knuckle receiving holes of the front axle of an automobile and one feature of the invention is the provision of pairs of centering points, arranged to receive and quickly engage the knuckle openings of the axle, when the axle is properly arranged or bent, to give the proper outward angle to the front wheels of the automobile.

A further feature of the invention is in so arranging the centering points that they will instantly designate when the knuckle openings are not in proper alignment, thus denoting that the axle must be given a greater or less degree of bend to properly align the openings.

A further feature of the invention is the provision of means for setting the centering points for cooperation with axles having varying degrees of angle, whereby each succeeding axle must be bent to the same consistency as the preceding axle before the centering points will accurately register with the knuckle openings therein, thus imparting a uniform angle to the wheels, when mounted on the axle.

A further feature of the invention is the provision of means for securely locking the parts of the device in their adjusted positions.

Other objects and advantages will be hereinafter more fully set forth and pointed out in the accompanying specification.

Figure 1:
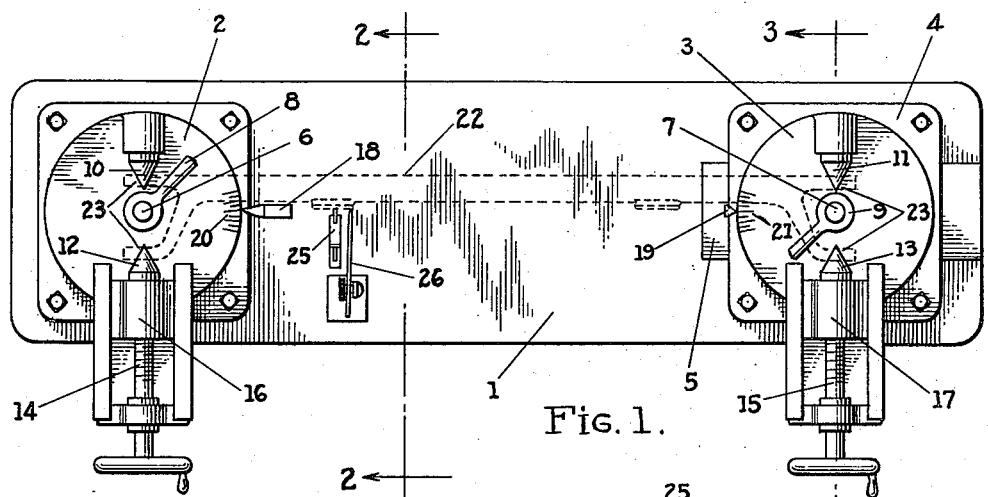
Figure 2:
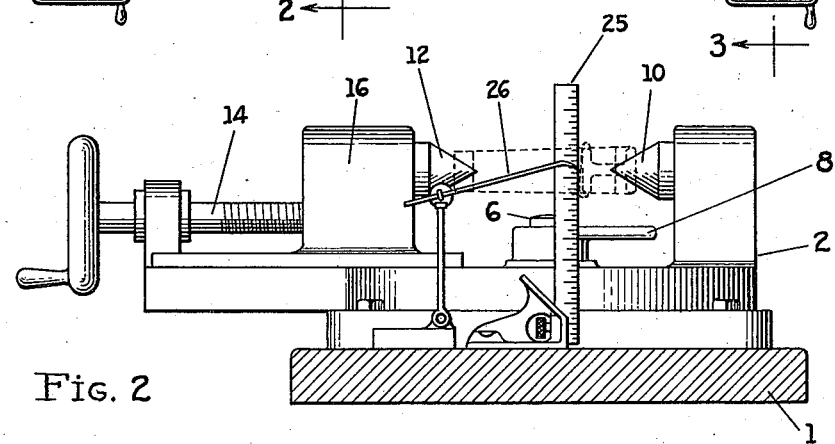
Figure 3:
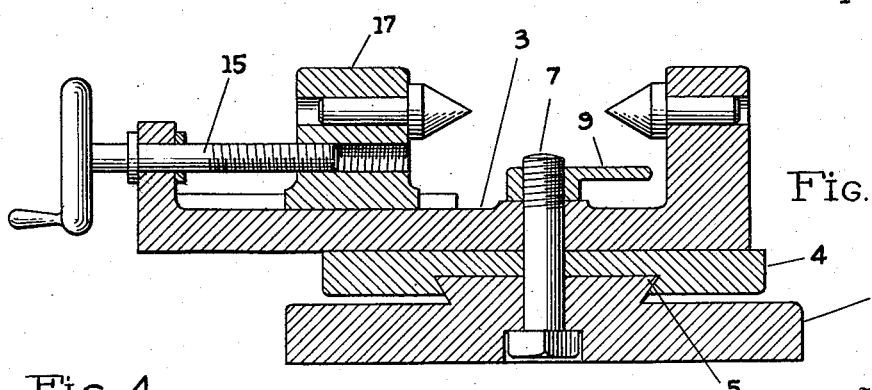
Figure 4:
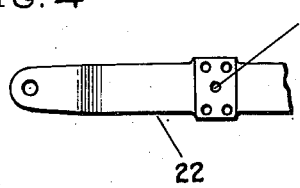

In the accompanying drawing which is made a part of this application, Figure 1 is a top plan view of the machine applied to use, Fig. 2 is a sectional view along line 2—2 Fig. 1, Fig. 3 is a similar view along line 3—3 Fig. 1, and Fig. 4 is a detail plan of an axle.

Referring to the drawing, 1 indicates the base of the machine, which may be constructed in any preferred manner, while 2 and 3 indicate heads, which are mounted upon the base, the head 2 being rotatable at a fixed point on the base, while the head 3 is pivotally secured to a carriage 4, slidable upon a gib 5, carried by the base. Passing centrally thru the respective heads 2 and 3 are studs 6 and 7, respectively, with which cooperate lever controlled nuts 8 and 9, whereby the nuts may be quickly loosened or tightened on the studs, and the heads released or clamped in fixed position.

Associated with the respective heads 2 and 3, are horizontally disposed centering points 10 and 11, which are designed to cooperate with centering points 12 and 13, slidably mounted on the heads 2 and 3, the points being arranged in pairs and designed to enter the knuckle openings in an axle, when in proper alignment. The centering points 12 and 13 are moved toward or from the points 10 and 11 by means of hand screws 14 and 15, the centering points 12 and 13 being attached to movable holders 16 and 17, with which the screws 14 and 15 cooperate.

Associated with the base 1 are index fingers or pointers 18 and 19, which cooperate with graduation scales 20 and 21 on the heads 2 and 3, respectively, said scales being arranged in the arcs of circles, so that the rotation of the heads may be accurately determined to set the centering points at a prescribed angle to a line longitudinally of the base, or to an axle 22, when entered between said centering points. As is well known, some wheels are given a greater degree of outer angle than others, and by providing the graduation scales and pointers, any desired degree of angle may be readily determined and the centering points arranged accordingly and without difficulty.

In applying this device to use, the heads 2 and 3 are first rotated until the fingers 18 and 19 are brought into registration with the proper sections of the scales 20 and 21, when the head 3 is adjusted on the base 1 to position the centering points to receive the axle. The nuts 8 and 9 are then turned onto the studs 6 and 7 to clamp the heads against rotation, thus holding the centering points permanently in position to receive successive axles to be tested.

The axle 22 is then placed in position between the pairs of centering points 10 and 12, and 11 and 13, and if the knuckle openings 23, at the respective ends of the axle, are disposed at the proper angles, the centering points will enter said openings, when the centering points 12 and 13 are turned towards the points 10 and 11. If the points do not accurately register with the knuckle openings, the operator knows instantly that the parts of the axle are not bent properly to give the desired degree of dish or angle to the wheel. The operator may instantly note, by observing the position of the centering points with respect to the knuckle openings, to what degree the axle must be additionally bent or straightened to cause the centering pins to accurately center with the knuckle openings.

Axles are usually provided with a dowel opening 24 for centering the anchoring support for the springs of a vehicle and to readily determine when the axle is positioned to receive the centering points, a suitable scale 25 may be adjustably mounted on the base 1, with which may cooperate a pointer 26, to be so adjusted that it will register at its free end with the dowel opening 24 in the axle, when the axle is properly located between the centering points to register the centering points with the knuckle openings 23, if the axle is bent to the right consistency.

This device is particularly applicable where four-wheel brakes are used, so as to bring the brakes into proper alignment with the angle of the front wheel of the vehicle, although it will be understood that it may be successfully used for aligning the knuckle openings when resting at right angles to the trend of the axle, as well as those which are inclined.

It will likewise be seen that the parts of the device may be quickly and accurately adjusted to give the proper alignment of the knuckle openings and then locked in such position so that successive axles may be gauged without resetting the parts of the device.

I claim as my invention:

1. In an angle testing means for automobile axles, a base, a pair of rotatable heads mounted thereon; means for locking said heads in adjusted position; means for determining the adjusted position of said heads; and a pair of centering points on each head for engagement with parts of an automobile axle for indicating the true alignment of said parts.

2. In an angle testing means for automobile axles, a pair of rotatable heads; a base on which said heads are mounted; a pair of centering points carried by each head; means for adjusting one of each pair of centering points towards or from its companion centering point; means for determining the adjusted position of each pair of cooperating centering points; and means for locking said head and centering points in adjusted position.

3. An angle testing means for automobile axles comprising a base, a pair of heads swivelly mounted on said base; means for locking said heads against rotation; a pair of centering points carried by each head; means for moving one of each pair of centering points towards or from its cooperating centering point; and graduated means for determining the degree of angle of the centering points to an object positioned therebetween.

4. An angle testing means for automobile axles comprising a base; pairs of centering points mounted on said base; means for adjusting one of each pair of centering points towards or from its cooperating centering point; and means for determining the degree of angularity of the pairs of centering points to an axle placed therebetween. whereby said centering points will accurately center in knuckle openings in the axle when said knuckle openings are at the proper angle.

5. An angle testing means for automobile axles, comprising a pair of heads; a base supporting said heads; means for rotatably mounting said heads on said base; means for adjustably mounting one of said heads on said base; a pair of centering points on each head; means for adjusting one of each pair of centering points towards or from its cooperating centering point; means for locking said heads in fixed position on the base; and means for accurately determining the degree of angularity of the centering points to an axle positioned between the pairs of centering points.

6. In an angle testing means for automobile axles, a base; a pair of heads revolubly mounted on said base; one of said heads being adjustable on said base towards and away from the other head; a pair of centering points on each head; means for adjusting one of each set of centering points towards or from its cooperating point; means for determining the adjusted positions of said pairs of centering points; and means for locking said heads in their adjusted positions.

In testimony whereof, I have hereunto set my hand on this the 21st day of May, 1927, A. D.

ARTHUR O. WANGER.